A. F. ZAHM.
PROPELLER HUB CONSTRUCTION.
APPLICATION FILED OCT. 13, 1916.

1,406,600.

Patented Feb. 14, 1922.

Inventor
ALBERT F. ZAHM.
John P. Fairbox
Attorney

UNITED STATES PATENT OFFICE.

ALBERT F. ZAHM, OF BUFFALO, NEW YORK, ASSIGNOR TO CURTISS AEROPLANE AND MOTOR CORPORATION, A CORPORATION OF NEW YORK.

PROPELLER-HUB CONSTRUCTION.

1,406,600. Specification of Letters Patent. Patented Feb. 14, 1922.

Application filed October 13, 1916. Serial No. 125,411.

*To all whom it may concern:*

Be it known that I, ALBERT F. ZAHM, a citizen of the United States, residing at Buffalo, in the county of Erie and State of New York, have invented certain new and useful Improvements in Propeller-Hub Construction, of which the following is a specification.

My invention relates in general to aerial propellers to be used in connection with aeronautical motors, and has for its object the production of a propeller of greatly improved strength and durability.

Heretofore it has been found that one of the weakest points in a propeller is at the hub section where an enormous value of torque must be transmitted from the steel hub, carried by the motor crankshaft, to the laminated wooden propeller body. Especially is this inherent weakness increasingly evident as the size of the propeller is increased with increase of power. Due to the fact that the wood of which propellers are constructed is susceptible to splitting it is found unwise to utilize penetrating bolts which have too tight a drive fit in the holes drilled therefor. Hence there is sometimes a slight amount of play of the retaining bolts in their holes through which they pass which gradually increases under the stress of severe and continued usage until sufficient under irregular operation of the driving motor to allow inertia strains to split the propeller at the hub. The splitting of a propeller is dangerous in the extreme since it not only deprives the aircraft of a power source, but in many cases results in loss of equilibrium of the aircraft.

Splitting or shattering at the tip of the blades is often experienced especially when conditions are such that water or sand are encountered in flight or upon landing or rising.

My invention consists of a construction which will totally overcome the above mentioned objections. The hub section of the propeller I construct with cross laminations, the grain of which lies at right angles to the layers comprising the main laminations of the entire propeller. The resistance which such cross laminated construction offers to any splitting action is very great, and hence it is possible to drive or fit the retaining bolts much more closely into the holes drilled in the wood. This greatly lessens the liability of the holes to enlargement, and eliminates splitting. Furthermore, I provide a metal sheathing for the tip of the blades through securing them at regular intervals of area, rather than irregular intervals. This tip is preferably of copper since this metal is not readily damaged or corroded by salt water. However, the nature of the particular material used does not in any way affect the purports and intentions of my invention.

Figure 2:
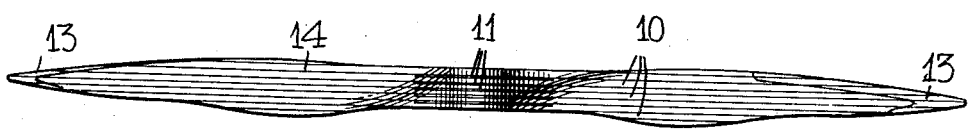
Fig. 2 is a longitudinal sectional view showing cross laminations.
Figure 3:
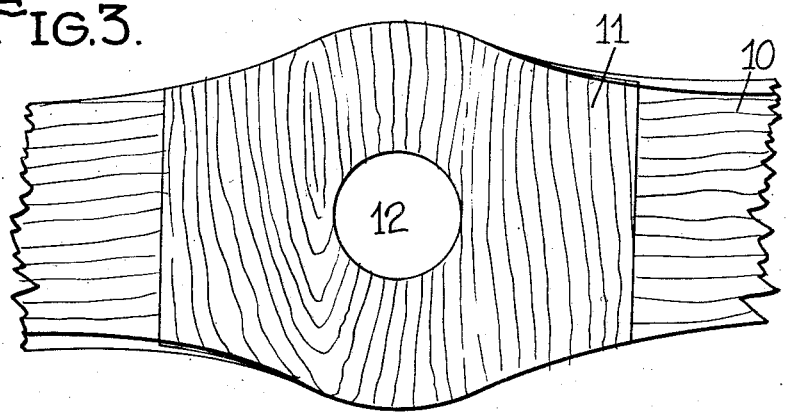
Fig. 3 is an enlarged view showing a lamination in plan.
Figure 4:
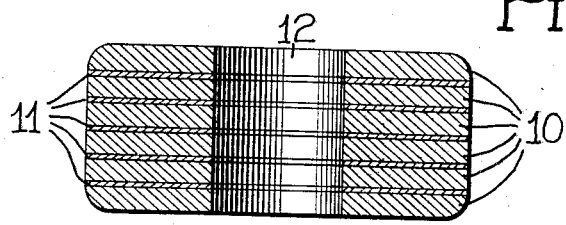
Fig. 4 is a lateral sectional view through the hub.

In Fig. 2 the longitudinal laminations which go to make up the propeller proper are designated as 10. The cross laminations are designated as 11, Figs. 2, 3 and 4. These cross laminations as 11 are fitted and glued into suitably rabbeted spaces cut or let into the main longitudinal laminations and extending laterally as regards the longitudinal axis of the propeller. The exact position of the auxiliary reinforcing laminations 11 may be seen by reference to Figs. 2 and 3.

Figure 1:
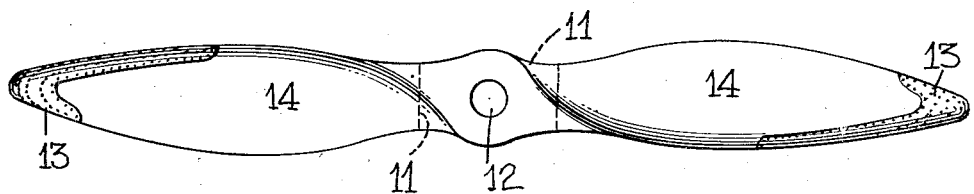
Fig. 1 is a plan view of a propeller.
Figure 5:
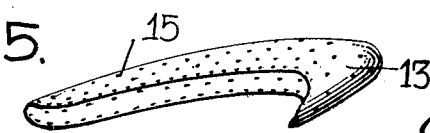
Fig. 5 is a view of a metal sheathe used to cover the blade tips.

In Fig. 1 the propeller tip reinforcing caps 13 are shown attached to the propeller blade as 14. The cap or tip 13 which is of the general form shown in Fig. 5 is pressed, cast or otherwise formed of any desirable metal and attached to the propeller blade in the manner hereinafter set forth, so that the longitudinally extending portion of the tip or cap 13 as 15 encases the leading edge of the propeller blade 14, Fig. 1. The tip is secured to the blade by rivets, screws, nails or the like which pass all the way through the blade and interconnect the portions of the tip lying on opposite sides thereof. Nails are usually used, and in any case the fastening means is headed over and soldered or similarly fastened on both sides.

According to my invention these nails are uniformly spaced per unit of area, the entire facing of the tip being laid out in units of area and the nails placed accurately and centrally of said area. The result of this uniform spacing is that each of the several nails or rivets retains an equal extent of tip area against the centrifugal stresses occasioned by the revolving mass. It is evident, therefore, that the proper size and spacing of the retaining nails may be obtained by suitable preliminary calculation. This equal distribution of the stresses effectually prevents rupture of the tip or entire loss thereof under any conditions. When it is considered that the practice heretofore has been to apply the nails or other fastening means to the tips miscellaneously, it will readily be seen that there were some portions of the surface strained inordinately with the result that the tip was cracked or broken in time or else raised from its contact with the body of the blade, thus admitting foreign substances, the centrifugal force of which drove them longitudinally of the blade and ripped the protective tip therefrom.

Quite frequently the irregular placement of the fastening means fail to provide sufficient strength to retain the tip on the blade at all, and the tips have been known to fly off at high speed, damaging the aircraft and at times causing disaster.

Thus it is seen that the propeller of my invention possesses a strength enabling it to meet the most exacting conditions of the present high powered motor units.

Obviously, many improvements may be made without departing from the original spirt of the invention, so long as the modifications fall within the scope of the appended claims.

What is claimed is:

1. A wooden aeronautical propeller in which the grain of the wood extends longitudinally and uninterruptedly through the hub from blade tip to blade tip, the propeller at the hub being reinforced by one or more cross grained reinforcing strips of wood for the purpose specified.

2. A laminated propeller, the blade laminations of which are common to both the blade and hub portions and the hub is provided with cross grained laminations in addition to and reinforcing the blade laminations at this point.

3. A laminated propeller for aircraft, the blade laminations of which extend into the hub portion and are mortised, together with separate cross grained laminations individual to the hub portion of the blade seated in said mortised portions of the blade laminations, whereby the hub portion is reinforced and the resistance to splitting is increased.

4. A laminated wooden propeller for aircraft, the hub portion of which is reinforced throughout by cross grained laminations independently of the stock of the blades, whereby the hub portion is reinforced and strengthened against splitting.

5. An aerial propeller comprising wooden blade laminations extending through the hub portion, and cross grained laminations in addition thereto interleaved between said blade laminations at the hub.

6. A two-bladed aeronautical wooden propeller formed of laminations following the grain of the wood and extending uninterruptedly through the propeller hub from blade tip to blade tip, and said hub being reinforced by cross grained wooden laminations alternating with said longitudinally grained laminations and terminating at the edges of the hub, whereby the resistance to splitting is increased.

7. A two bladed aeronautical wooden propeller formed of laminations following the grain of the wood and extending uninterruptedly through the propeller hub from blade tip to blade tip, and said hub being reinforced by cross grained wooden laminations alternating with said longitudinally grained laminations and terminating at the edges of the hub, whereby transverse clamping bolts may be given a driving fit therein without splitting or weakening the propeller.

In testimony whereof I affix my signature.

ALBERT F. ZAHM.